Patented May 17, 1932 1,858,828

UNITED STATES PATENT OFFICE

CARL IMMERHEISER AND BODO ZSCHIMMER, OF LUDWIGSHAFEN-ON-THE-RHINE, GERMANY, ASSIGNORS, BY MESNE ASSIGNMENTS, TO GENERAL ANILINE WORKS, INC., OF NEW YORK, N. Y., A CORPORATION OF DELAWARE

MANUFACTURE OF PIGMENT COLORS

No Drawing. Application filed April 22, 1926, Serial No. 103,966, and in Germany May 1, 1925.

In the Patent No. 1,529,891 there is described a process for the manufacture of green pigment colors by acting on nitroso-beta-naphthol, preferably in the form of its bisulfite compound, with iron salts in the presence or absence of substrates.

We have now found that the shade of the said pigment colors, while retaining or even increasing their excellent fastness to light and alkalies, can be influenced by preparing the said green pigment color in the presence of basic dyestuffs, preferably those belonging to the malachite green series. The process may be carried out for example by dissolving the nitroso-beta-naphthol in water with the aid of a bisulfite, adding the iron salt in the manner described in the Patent No. 1,529,891 or in any other manner or in molecular proportions for example in a still much more restricted quantity, or in larger amounts, for instance in the proportion of about 1 atom of iron to two molecules of nitroso-beta-naphthol in the absence or presence of Turkey red oil or other dispersing agents, adding the basic dyestuff to the mixture and precipitating the pigment color by means of an alkaline agent, for example sodium carbonate. It has been proved of special advantage to add a small quantity of the alkaline agent insufficient for precipitation before adding the basic dyestuff and then precipitating the pigment by adding the rest of the alkaline compound.

Instead of nitroso-beta-naphthol, its bisulfite compound may also be employed, preferably with an addition of some excess of bisulfite solution.

The products obtained by the process according to the present invention are faster to light than a mere mechanical mixture of the iron compound of alpha-nitroso-beta-naphthol with a basic dyestuff. They are therefore thought to be a kind of complex compound, but applicants do not wish to bind themselves to this explanation.

The following example will further illustrate how our invention may be carried out in practice, but the invention is not limited to this example. The parts are by weight.

1116 parts of alpha-nitroso-beta-naphthol paste of 15 per cent strength that is about 167 parts of alpha-nitroso-beta-naphthol are mixed with 650 parts of sodium bisulfite solution of 38° Bé. and 3000 parts of water and dissolved by stirring for 3 hours. The solution is filtered and filled up with water to about 5000 parts. 48 parts of crystallized ferrous sulfate dissolved in 960 parts of water, 24 parts of Turkey red oil in 240 parts of water, 100 parts of soda ash dissolved in 1000 parts of water and 40 parts of diamond green BX (see color index No. 657) dissolved in 4000 parts of water are then added to the solution one after the other, whereupon a solution of 260 parts of soda ash in 2600 parts of water is caused to run in slowly. After the green pigment color is completely precipitated, 4 parts of aluminium hydroxid in the form of a 4 per cent paste are added; the product is washed by decanting twice with water and filtered off. About 1120 parts of the pigment color in the form of a 12 per cent paste are obtained. The color possesses excellent fastness to light and lime.

What we claim is:

1. The process of manufacturing pigment colors which comprises acting with an iron salt on nitroso-beta-naphthol in the presence of a basic dyestuff and precipitating the pigment color by means of an alkaline agent.

2. The process of manufacturing pigment colors which comprises acting with an iron salt on nitroso-beta-naphthol in the presence of a basic dyestuff and a substrate and precipitating the pigment color by means of an alkaline agent.

3. The process of manufacturing pigment colors which comprises acting with an iron salt on nitroso-beta-naphthol in the presence of a basic dyestuff and a dispersing agent and precipitating the pigment color by means of an alkaline agent.

4. The process of manufacturing pigment colors which comprises mixing an iron salt solution with a solution of nitroso-beta-naphthol in a water solution of a bisulfite, adding an alkaline agent in a quantity insufficient for precipitation, adding a basic dyestuff and precipitating the pigment color by means of an alkaline agent.

5. The process of manufacturing pigment colors which comprises acting with an iron salt on nitroso-beta-naphthol in the presence of a basic dyestuff of the malachite green series, and precipitating the pigment color by means of an alkaline agent.

6. The process of manufacturing pigment colors which comprises acting with an iron salt on nitroso-beta-naphthol in the presence of diamond green BX, and precipitating the pigment color by means of an alkaline agent.

7. The process of manufacturing pigment colors which comprises mixing an iron salt solution with a solution of nitroso-beta-naphthol in a bisulphite, adding an alkaline agent in a quantity insufficient for precipitation, adding a basic dyestuff of the malachite green series, and precipitating the pigment color by means of an alkaline agent.

8. The process of manufacturing pigment colors which comprises mixing an iron salt solution with a solution of nitroso-beta-naphthol in a bisulphite, adding an alkaline agent in a quantity insufficient for precipitation, adding diamond green BX, and precipitating the pigment color by means of an alkaline agent.

9. The process of manufacturing pigment colors which comprises mixing a solution of about 48 parts of ferrous sulfate with a solution of about 167 parts of nitroso-beta-naphthol in a bisulphite, adding an alkaline agent in a quantity insufficient for precipitation, adding about 40 parts of diamond green BX, and precipitating the pigment color by means of an alkaline agent.

10. As a new article of manufacture, a complex composition of an iron compound of nitroso-beta-naphthol and a basic dyestuff, which composition is faster to light than the mere mechanical mixture of the said two components, and which is obtained by acting with an iron salt on nitroso-beta-naphthol in the presence of a basic dyestuff, and precipitating the pigment color by means of an alkaline agent.

11. As a new article of manufacture, a complex composition of an iron compound of nitroso-beta-naphthol and a basic dyestuff of the malachite green series, which composition is faster to light than the mere mechanical mixture of the said two components, and which is obtained by acting with an iron salt on nitroso-beta-naphthol in the presence of a basic dyestuff of the malachite green series, and precipitating the pigment color by means of an alkaline agent.

12. As a new article of manufacture, a complex composition of an iron compound of nitroso-beta-naphthol and diamond green BX, which composition is faster to light than the mere mechanical mixture of the said two components, and which is obtained by acting with an iron salt on nitroso-beta-naphthol in the presence of diamond green BX, and precipitating the pigment color by means of an alkaline agent.

In testimony whereof we have hereunto set our hands.

CARL IMMERHEISER.
BODO ZSCHIMMER.